United States Patent
Burns et al.

(10) Patent No.: US 8,331,659 B2
(45) Date of Patent: Dec. 11, 2012

(54) METHOD AND APPARATUS FOR REDUCED COMPLEXITY VIDEO PROCESSING VIA SPECIAL CHROMA HANDLING

(75) Inventors: Kathleen Burns, Doylestown, PA (US); Larry Pearlstein, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 1204 days.

(21) Appl. No.: 12/126,321

(22) Filed: May 23, 2008

(65) Prior Publication Data

US 2009/0290789 A1    Nov. 26, 2009

(51) Int. Cl.
    *G06K 9/00*    (2006.01)
    *G06K 9/40*    (2006.01)
(52) U.S. Cl. ........................ 382/162; 382/274
(58) Field of Classification Search .......... 382/162–167, 382/100, 254, 274–275; 348/222.1, 662, 348/663, 663.722, 180; 715/723, 700, 719, 715/802; 345/589–604

See application file for complete search history.

(56) References Cited

U.S. PATENT DOCUMENTS

| 6,337,710 B1* | 1/2002 | Watkins ........................ 348/180 |
| 7,643,700 B2* | 1/2010 | Kodama ........................ 382/282 |
| 8,185,843 B2* | 5/2012 | Bhatt et al. .................... 715/802 |

* cited by examiner

*Primary Examiner* — Ishrat I Sherali

(74) *Attorney, Agent, or Firm* — Thomas|Horstemeyer

(57) ABSTRACT

A method and apparatus for reduced complexity video and image processing with special chroma handling are disclosed. Frame-type decisions are made on a video stream made up of a sequence of frames. A first subset of the frames are selected to be monochrome and generated without chroma data. A second subset of the frames are selected to be in color and generated with chroma components. In one embodiment, the first subset of frames includes odd frames and the second subset of frames includes even frames in the video stream. Under higher video frame rates, the lack of color in every other frame is not visible to the end viewer. Accordingly, subsequent processing of the output video stream permits luma-only processing of many frames in the video stream, extensively reducing the amount of computation.

20 Claims, 2 Drawing Sheets

METHOD AND APPARATUS FOR REDUCED COMPLEXITY VIDEO PROCESSING VIA SPECIAL CHROMA HANDLING

FIELD OF INVENTION

The present invention is related to high quality, reduced complexity video processing. More particularly, the present invention is related to special chroma handling in high-rate video processors.

BACKGROUND

Modern standard definition digital video and television devices and, to a greater degree, high-definition (HD) digital video and television devices are being designed with increasingly higher video data or frame rates to provide high quality video to the user. Additionally, many advanced video processing techniques have been developed, for example three dimensional (3D) graphics rendering techniques, which require complex design and computation. As video data rates increase, sophisticated video processing algorithms such as graphics rendering become increasingly costly and difficult to implement.

Many video processing problems involve the processing of luminance (luma) and chrominance (chroma) components of the video frames, where luma represents the brightness or the achromatic component of the image, and chroma represents the color information. The human eye tends to be more perceptive to variations in brightness than color such that lower color detail can go unnoticed to a viewer. Thus, to reduce data rates and processing requirements, some conventional video processing systems operate on reduced resolution chroma signals. This is typically achieved by chroma subsampling, or mild down sampling of the chroma components at ratios of 2:1, 3:1 or 4:1 in a vertical and/or horizontal direction within each frame. However, chroma subsampling can cause artifacts in images causing them to appear fuzzy or blurry, particularly in areas of high detail. Moreover, down sampling of chroma data generally does not sufficiently decrease the load on complex video processors under high video data rates.

Accordingly, there is a need for high quality video processing with reduced computational complexity.

SUMMARY

A method and apparatus for reduced complexity video and image processing with special chroma handling are disclosed. For a video data stream or graphics stored in memory made up of a sequence of images, a first subset of the images are selected to be processed as monochrome and generated without chroma data or with zero-valued chroma data. A second subset of the images are selected to be processed as color and generated with chroma components. Additionally, a video processing component may be instructed to treat the chroma data in the first subset of images as zero-valued, regardless of the actual value. Accordingly, subsequent processing of the output video stream permits luma-only processing of many frames in the video stream, extensively reducing the amount of computation. Under certain video frame rates, the lack of color in a select set of frames is not perceptible to the end viewer. In alternate embodiments, frame-type decisions may be made to include one or more of monochrome, normal chroma or enhanced chroma type frames in any combination.

BRIEF DESCRIPTION OF THE DRAWINGS

A more detailed understanding may be had from the following description, given by way of example and to be understood in conjunction with the accompanying drawings wherein.

DETAILED DESCRIPTION

The apparatus and method disclosed herein may be used in any device that performs processing on high frame rate video or graphics. Possible applications include, but are not limited to, frame rate conversion processors in digital television receivers, panel processors, video encoders, computer graphics systems or any other image sequence processors or generators. The apparatus and method may be applied to high frame rate video compression systems, and is relevant to standards that involve conveying video data at high frame rates including, but not limited to, digital video broadcasting (DVB) for satellite (DVB-S), terrestrial television (DVB-T), or handheld devices (DVB-H), MediaFLO and evolution-data optimized (EV-DO). A video stream as discussed herein is made up of a sequence of images or frames.

Figure 1:
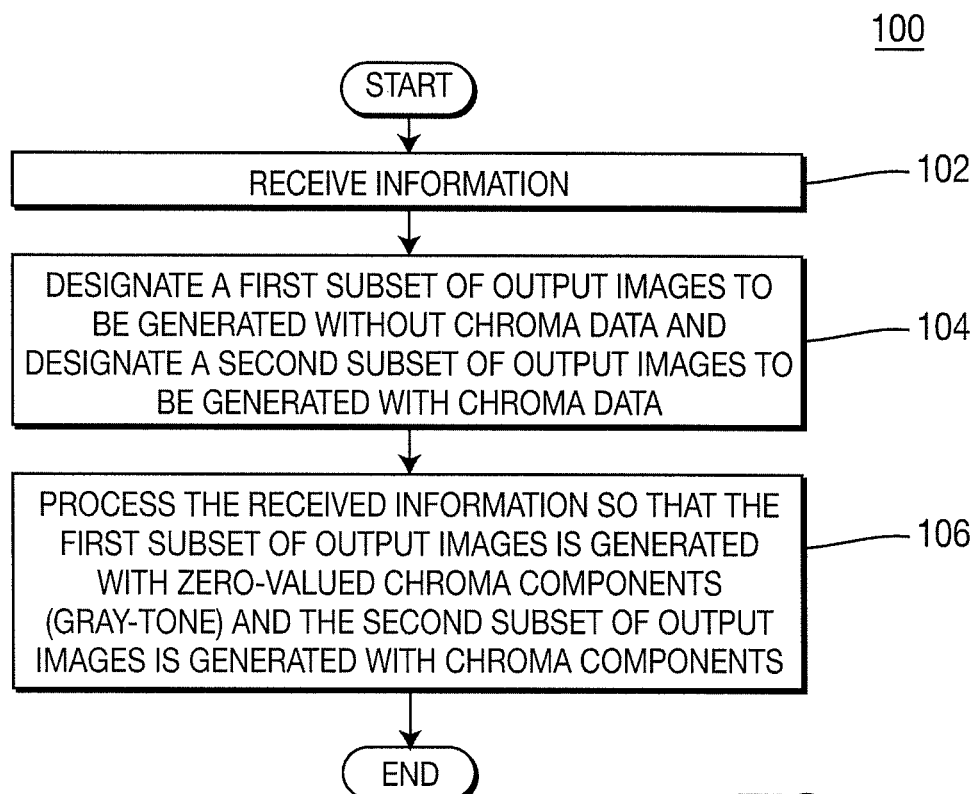
FIG. 1 is a flow diagram for special chroma handling of an output video data stream with frame-type decision utilizing the teachings herein.

FIG. 1 is a flow diagram of a process 100 for performing special chroma handling for output video data streams. The process 100 may be used in any video processing application, for example, in frame rate conversion processors in digital televisions, or in graphics processors for computers and panel displays. Referring to FIG. 1, information is received in step 102. Received information may be, for example, an input video data stream or graphics commands for storing and/or modifying graphics or pixel values stored in memory, where graphics commands may include, for example, instructions for rendering 3D graphics. The input video data stream or graphics commands are processed to modify a set of output images or stored pixel values, as will be described in detail hereafter.

A first subset of the output images is designated to be generated without chroma data, and a second subset of the output images is designated to be generated with chroma data in step 104. Subsequently, the received information is processed so that the first subset of output images is generated with zero-valued chroma components, or with absent chroma components that are treated as having the value zero, and the second subset of output images is generated with chroma components in step 106. The processing of the first and second subsets of output images could occur in any order, and, moreover, could be processed in parallel. The generating of output images may include, but is not limited to, an output video data stream or storage and or modification of image pixel values in memory.

According to one preferred embodiment, the second subset of output images is generated with enhanced chroma components so that the color saturation of these images is increased.

When digital chroma is represented according to an offset binary system, increasing the intensity of chroma may require subtracting the offset from the chroma component, multiplying by a chroma gain value, and then adding the offset back to the scaled chroma component. The process of enhancing chroma components may result in overflow of the chroma components. To avoid overflow, clipping could be applied to enforce a maximum range of chroma values, and it could be applied in such a way as to avoid shifts in hue.

According to another preferred embodiment, even numbered output images from the video stream or stored in memory are identified as belonging to the first subset to be generated with zero-valued chroma data, and odd numbered output images are identified as belonging to the second subset to be generated with chroma or enhanced chroma data. To produce enhanced chroma in the second subset, the chroma components may be doubled in intensity, for example. It has been found by experimentation that, at video frame rates of approximately 75 Hz or higher, it becomes extremely difficult for a viewer to discern that the chrominance information is missing from every other image frame, thus effectively reducing complexity without reducing video quality.

Alternatively, the first and second subsets of output images may be chosen according to any other selection process, as desired. Moreover, frame-type decisions may be made to include any of monochrome, normal chroma or enhanced chroma type frames in any combination. For example, three subsets of output images may be identified, where the first subset is generated with zero chroma values, the second subset is generated with standard or default chroma values and the third subset is generated with enhanced chroma values. The three subsets could be arranged to represent every three frames in the video sequence.

Figure 2:
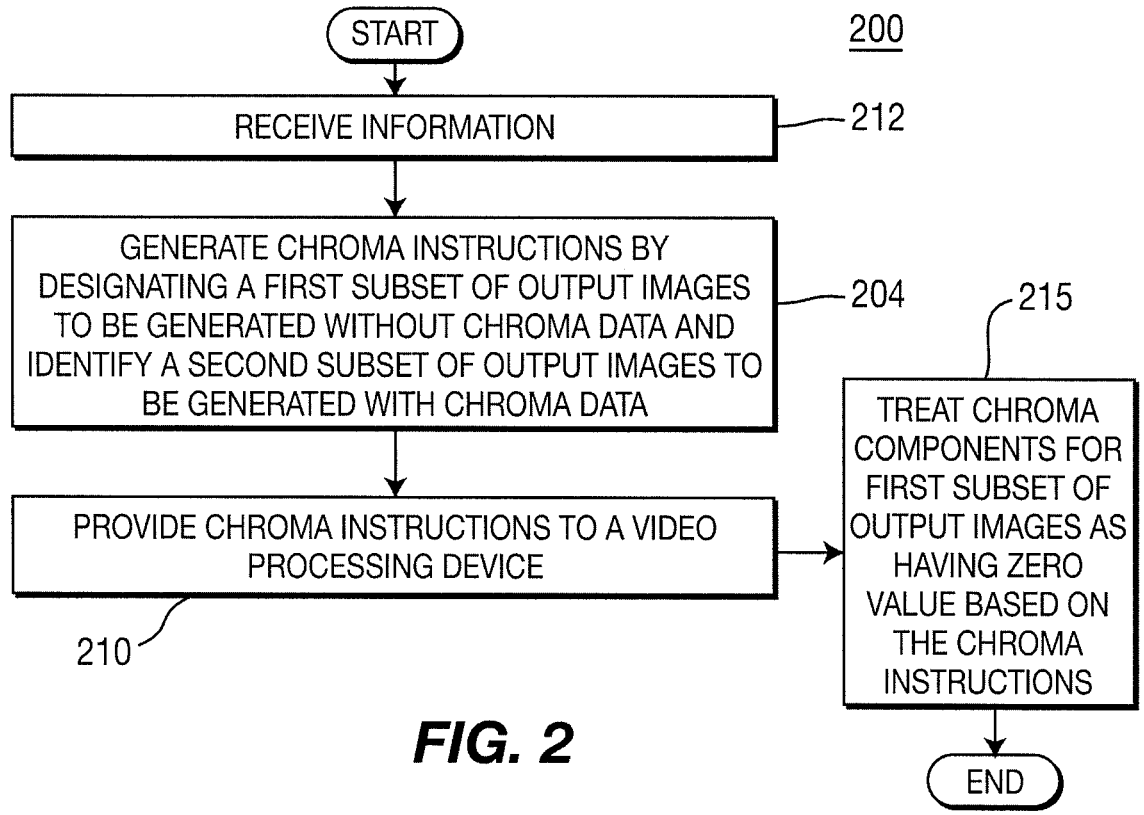
FIG. 2 is a flow diagram for special chroma handling of stored images with frame-type decision utilizing the teachings herein.

FIG. 2 is a flow diagram of a process 200 for performing special chroma handling for output video data streams, where a video processing device that receives the output images is instructed to treat the chroma components in the first subset of images as having values of zero, regardless of the chroma information provided. Information is received in step 202. Chroma instructions are generated by designating a first subset of output images to be generated without chroma data and designating a second subset of output images to be generated with chroma data in step 204. The chroma data in the second subset of output images may be designated as enhanced chroma data. The chroma instructions are provided to a video processing device in step 210. The chroma components for the first subset of output images are then treated as having zero value according to the chroma instructions in step 215. This preferably occurs in the video processing device. Accordingly, if the chroma components for the first subset of frames, as provided to the video processing device, have non-zero values; the chroma values are ignored for processing purposes in order to reduce complexity.

The processes 100 and 200 are described such that chroma settings are decided on a frame-by-frame, or equivalently image-by-image, basis. However, the techniques described herein could easily be extended to provide decisions regarding chroma data on portions of an image, or on groups of images together. Moreover, the techniques for chroma data disclosed herein can be combined with other techniques for reducing processing complexity including, for example, chroma subsampling.

Figure 3:
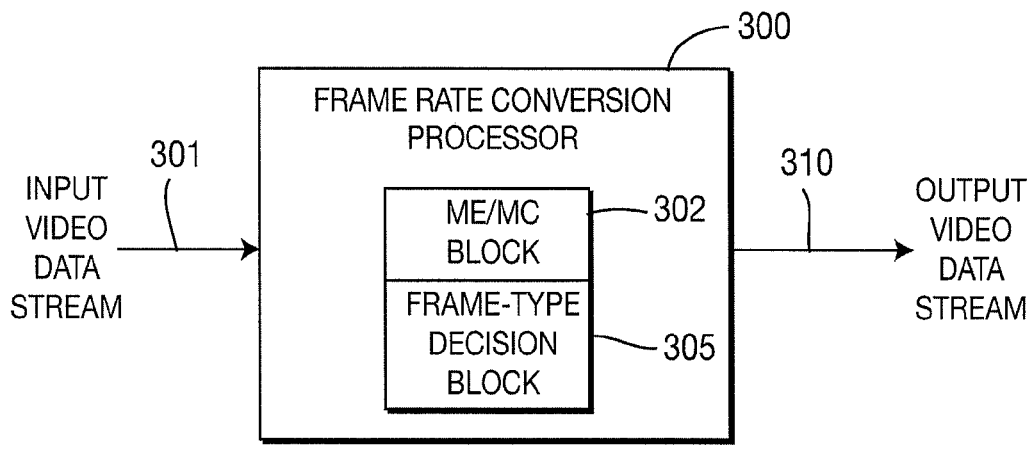
FIG. 3 is a block diagram of a frame-rate conversion processor with frame-type decision utilizing the teachings herein.

FIG. 3 illustrates an example embodiment where frame-type decisions as described hereinbefore may be effectively employed to reduce computational complexity. Frame rate conversion processor 300 serves as an example and does not in any way limit the application of frame-type decisions for chroma components as disclosed herein. Moreover, the depiction is purposely simplified in order not to limit the structure and component interactions to any particular implementation.

FIG. 3 is a diagram of a frame-rate conversion processor 300 that may be used, for example, in a digital television receiver. Frame-rate conversion processor 300 accepts input video data stream 301 via an input to frame rate conversion processor 300, produces output video data stream 310, and includes motion estimation/motion compensation block (ME/MC) 302 and frame-type decision block 305. Frame-type decision block 305 makes decisions on the chroma information for the output video data stream 310 and provides the chroma decisions to ME/MC block 302. ME/MC block 302 generates video data stream 310 with a converted frame rate based on the input video data stream 301 and the chroma instructions from frame-type decision block 305.

By way of example, frame rate conversion processor 300 doubles the frame rate of input video data stream 301, for example, from 60 frames per second to 120 frames per second. ME/MC block 20 generates a new set of frames to be added to frames in the input video data stream 301 in order to generate output video data stream 310 with twice the frame rate. In one example, frame-type decision block 305 instructs ME/MC block 302 to generate the new set of frames with zero-valued chroma data and to process the new frames with luma only information. Additionally, frame-type decision block 305 may instruct ME/MC block 302 to process the frames in the original input video data stream 301 with enhanced chroma data. Accordingly, ME/MC block 302 does not perform any computation on chroma components when generating the new set of frames and the processing complexity in the ME/MC is reduced. More generally, frame-type decision block 305 designates a first subset of frames in output video data stream 310 to have zero valued chroma components, and designates a second subset of frames to have enhanced chroma components. As described above, the first and second subsets could be, for example, alternating frames in the video stream, where the first subset was generated by ME/MC block 302 to increase the frame rate of the video data stream.

Figure 4:
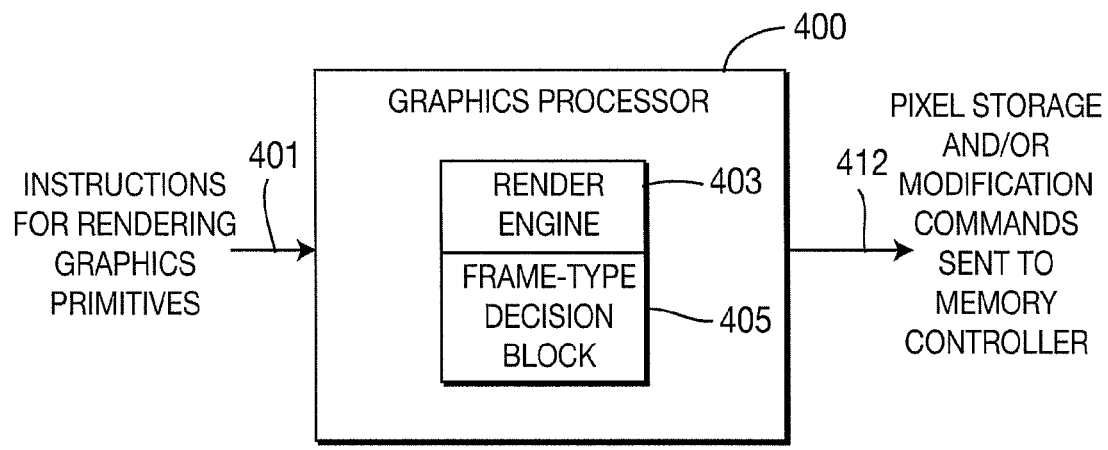
FIG. 4 is a block diagram of a graphics processor with frame-type decision utilizing the teachings herein.

FIG. 4 illustrates another example embodiment where frame-type decisions as described hereinbefore may be effectively employed to reduce computational complexity. FIG. 4 is a high-level block diagram of graphics processor 400 that accepts instructions for rendering graphics primitives 401 via an input to graphics processor 400, includes render engine 403 and frame-type decision block 405, and provides pixel storage and/or modification commands 412 preferably to a memory controller (not shown) in order to modify graphics stored in an external memory. Generally speaking, instructions 401 include instructions for rendering graphics primitives by altering pixel values contained in a memory buffer, where new pixel values are communicated to the memory buffer via a memory controller interface. Instructions for rendering graphics primitives 401 may come from, for example, a graphics software layer which is coupled to an application such as a real-time computer game or Computer Aided Design software. Render engine 403 translates instructions for rendering graphics primitives 401 via complex processing into pixel storage and/or modification commands 412 for writing pixel values to memory via a memory controller.

Frame-type decision block 405 makes decisions on chroma information based on instructions for rendering graphics primitives 401, and preferably identifies a first subset of images or graphics among the images stored in memory to have zero valued chroma components, and identifies a second subset of images to have enhanced chroma components. The frame-type decision information is provided to render engine 403, which renders the graphics with luma-only processing for the first subset of images, thus reducing the processing complexity of image rendering. Render engine 403 subsequently provides pixel storage and/or modification commands 412, which preferably include addresses and pixel values, to a memory controller in order to change pixel values for the graphics stored in memory (not shown). These new pixel values reflect the frame-type decision information where the first subset of images or graphics are stored with zero chroma values.

Figure 5:
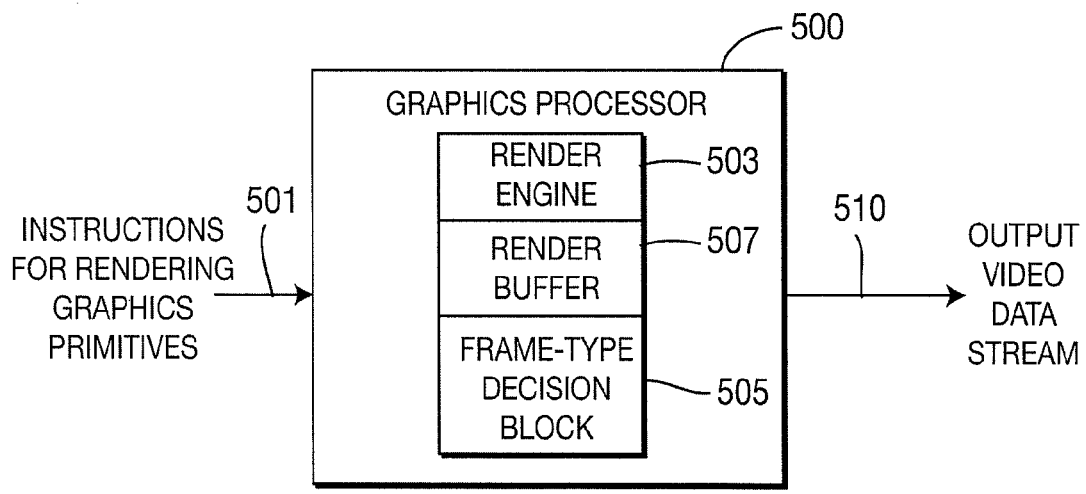
FIG. 5 is a block diagram of a graphics processor with frame-type decision utilizing the teachings herein.

FIG. 5 illustrates another example embodiment where frame-type decisions as described hereinbefore may be effectively employed to reduce computational complexity. FIG. 5 shows a high-level block diagram of a graphics processor 500 that accepts instructions for rendering graphics primitives 501 via an input to graphics processor 500, provides output video data stream 510, and includes render engine 503, frame-type decision block 505, and render buffer 507 for storing graphics internally to graphics processor 500. Frame-type decision block 505 makes decisions on chroma information based on instructions for rendering graphics primitives 501, and preferably identifies a first subset of images among the images to be stored in render buffer 507 to have zero valued chroma components, and identifies a second subset of images to have enhanced chroma components and provides the frame-type decision information to render engine 503. Render engine 503 renders graphics based on instructions for rendering graphics primitives 501 and the frame-type decision information, where the first subset of images are processed with luma-only data. Render engine 503 subsequently stores the rendered pixel values in render buffer 507, where the new pixel values reflect the frame-type decision information where the first subset of images are stored with zero chroma values and the second subset of images are stored with enhanced chroma values. Alternatively, for the first subset of images, chroma components may not be stored or may be stored with non-zero values, such that the first subset of images are subsequently treated as having the value zero chroma based on frame-type instructions Render buffer 507 produces output video data stream 510 as generated from the images stored in render buffer 507, which may be provided to, for example, a display (not shown).

An advantage of the special chroma handling techniques disclosed hereinbefore, in additional to reduced processing complexity, is reduced processing power that can be used, for example, in devices with limited power supply or that operate in a low power mode. By way of example, a device can operate in standard mode such that regular chroma and luma processing can be performed for each frame, and in a low power mode employing special chroma handling where a subset of frames are processed with luma-only information implemented, as described above. Example applications of a lower power mode include, but or not limited to, devices such as notebook or laptop computers, direct television (DTV), and handheld device.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be represented in code, such as hardware description language code, or stored in a computer readable storage medium, such that when processed, synthesized or operated upon, can be used to manufacture such processors.

What is claimed is:

1. A method for reduced-complexity video processing comprising:
   receiving information for a sequence of images;
   designating a first subset of images from the sequence of images to be processed with corresponding chroma components and designating a second subset of images from the sequence of images to be processed without corresponding chroma components, for each corresponding chroma components; of the first subset of images,
   increasing an intensity of the chroma component by subtracting an offset from the chroma component;
   multiplying the chroma component by a gain value to generate a scaled chroma component; and
   adding the offset back to the scaled chroma component.

2. A method for reduced-complexity video processing comprising:
   receiving information for a sequence of images;
   designating a first subset of images from the sequence of images to be processed with corresponding chroma components and designating a second subset of images from the sequence of images to be processed without corresponding chroma components;
   rendering graphics primitives based on the received information and the designations of the first subset of images and the second subset of images, wherein the received information includes instructions for rendering graphics primitives; and
   modifying pixel values stored in memory based on the rendered graphics primitives and the designations of the first subset of images and the second subset of images, wherein the pixel values for the second subset of images are stored without chroma components.

3. The method of claim 2, wherein the designation of the second subset of images further comprises processing the second subset of images by treating the corresponding chroma components as having zero value.

4. The method of claim 2, wherein the designation of the first subset of images further comprises processing the first subset of images with corresponding chroma components.

5. The method of claim 2, wherein the designation of the first subset of images further comprises processing the first subset of images with enhanced corresponding chroma components.

6. The method of claim 2, wherein the first subset of images includes odd numbered images in the sequence of images and the second subset of images includes even-numbered images in the sequence of images.

7. The method of claim 6, wherein the first subset of images is included in an input video data stream and the second subset of images is generated during frame-rate conversion to generate an output video data stream with twice the frame rate.

8. The method of claim 2 wherein the designation of the second subset of images is such that only a portion of the second subset of images is designated to be processed without corresponding chroma components.

9. A non-transient computer-readable storage medium configured to execute the method of claim 2.

10. A processing device for reduced complexity video processing comprising: an input configured to receive information for a first subset of images and a second subset of images;
a frame-type decision block configured to designate the first subset of images to be processed with corresponding chroma components and designate the second subset of images to be processed without corresponding chroma components;
a processing block configured to process the first subset of images with enhanced corresponding chroma components based on the designation of the first subset of images; for each corresponding chroma component of the first subset of images, the processing block being further configured to:
increase an intensity of each chroma component by subtracting an offset from the chroma component;
multiply the chroma component by a gain value to generate a scaled chroma component; and
add the offset back to the scaled chroma component.

11. A processing device for reduced complexity video processing comprising:
an input configured to receive information for a first subset of images and a second subset of images;
a frame-type decision block configured to designate the first subset of images to be processed with corresponding chroma components and designate the second subset of images to be processed without corresponding chroma components;
a render engine configured to render graphics primitives based on the received information and the designations of the first subset of images and the second subset of images, wherein the received information includes instructions for rendering graphics primitives; and
a memory controller configured to modify pixel values stored in memory based on the rendered graphics primitives and the designations of the first subset of images and the second subset of images, wherein the pixel values for the second subset of images are stored without chroma components.

12. The processing device of claim 11 wherein the received information is an input video data stream.

13. The processing device of claim 11 configured as a frame-rate conversion processor.

14. The processing device of claim 11 configured as a graphics processor.

15. The processing device of claim 11 wherein the frame-type decision block is configured to designate only a portion of the second subset of images to be processed without corresponding chroma components.

16. A processing device for reduced complexity video processing comprising:
an input configured to receive information for a first image and a second image;
a frame-type decision block configured to designate the first image to be processed with corresponding chroma components and designate the second image to be processed without corresponding chroma components; and
a processing block configured to process the first image with enhanced corresponding chroma components based on the designation of the first image, wherein for each corresponding chroma component of the first image, the processing block is further configured to:
increase an intensity of each chroma component by subtracting an offset from the chroma component;
multiply the chroma component by a gain value to generate a scaled chroma component; and
add the offset back to the scaled chroma component.

17. A method for reduced-complexity video processing comprising:
receiving information for a first image and a second image;
designating the first image to be processed with corresponding chroma components and designating the second image to be processed without corresponding chroma components, wherein the designation of the first image further comprises processing the first image with enhanced corresponding chroma components;
for each corresponding chroma component of the first image:
increasing an intensity of the chroma component by subtracting an offset from the chroma component;
multiplying the chroma component by a gain value to generate a scaled chroma component; and
adding the offset back to the scaled chroma component.

18. A processing device for reduced complexity video processing comprising:
an input configured to receive information for a first image and a second image;
a frame-type decision block configured to designate the first image to be processed with corresponding chroma components and designate the second image to be processed without corresponding chroma components;
a processing block configured to process the first image with enhanced corresponding chroma components based on the designation of the first image;
a render engine configured to render graphics primitives based on the received information and the designations of the first and second images, wherein the received information includes instructions for rendering graphics primitives; and
a memory controller configured to modify pixel values stored in memory based on the rendered graphics primitives and the designations of the first and second images, wherein the pixel values for the second image are stored without chroma components.

19. A non-transient computer-readable storage medium configured to execute the method of claim 17.

20. A non-transient computer-readable storage medium configured to execute the method of claim 1.

* * * * *